US006493982B1

United States Patent
Macaluso

(10) Patent No.: US 6,493,982 B1
(45) Date of Patent: Dec. 17, 2002

(54) ARM CRADLE FOR FISHING ROD

(76) Inventor: Michael Macaluso, 9 Kassel Ct., Mamaroneck, NY (US) 10543

( * ) Notice: Subject to any disclaimer, the term of this patent is extended or adjusted under 35 U.S.C. 154(b) by 0 days.

(21) Appl. No.: 09/595,135

(22) Filed: Jun. 16, 2000

Related U.S. Application Data

(63) Continuation-in-part of application No. 09/427,408, filed on Oct. 25, 1999, now Pat. No. 6,295,755.

(51) Int. Cl.$^7$ .......................... A01K 87/00; A01K 97/10
(52) U.S. Cl. ............................................. 43/25; 43/21.2
(58) Field of Search ............................ 43/25, 23, 21.2; 248/230.6, 231.71

(56) References Cited

U.S. PATENT DOCUMENTS

| | | | | |
|---|---|---|---|---|
| 1,266,367 A | * | 5/1918 | Wilson | 248/230.6 |
| 2,146,350 A | * | 2/1939 | Roberts | 43/25 |
| 2,158,104 A | * | 5/1939 | Bowen | 43/25 |
| 2,244,408 A | * | 8/1941 | Thompson | 43/25 |
| 3,367,056 A | * | 2/1968 | Johson | 43/25 |
| 3,372,510 A | * | 3/1968 | Arsenault | 43/21.2 |
| 4,190,977 A | * | 3/1980 | Casper | 43/21.2 |
| 5,007,612 A | * | 4/1991 | Manfre | 248/558 |

* cited by examiner

Primary Examiner—Kurt Rowan
(74) Attorney, Agent, or Firm—Lackenbach Siegel Marzullo Aronson & Greenspan

(57) ABSTRACT

A device supporting the arm of a fisherman using a spinning-type fishing rod having a cylindrical rod handle providing a gripping area for the hand of the fisherman, comprising a cradle member supporting the upper forearm of the fisherman and a rod handle support member holding the fishing rod handle in alignment with the cradle member. The rod handle support member is positioned below and rotatably connected with the cradle member about a horizontal axis of rotation. The handle support member and the cradle member are each rotable about the horizontal axis to a plurality of positions in response to pressure applied to said cradle member and the rod handle support member. A clamp attached to the rod handle support member removably grips the rod handle to the handle support member. Self-adjusting positioning means both locks said cradle means with the handle support member at any of a plurality of positions at a locked position wherein the forearm is in a comfort zone and further unlocks the cradle member and the handle support member from the locked position both in response to pressure exerted by the forearm to find a new comfort zone and in response to pressure associated with the fishing rod during fishing that in turn exerts pressure on the rod handle support member. The fishing rod handle gripping compartment and the arm cradle compartment each have an axis positioned in a vertical planes that are offset from one another with the vertical plane of the cradle compartment being nearer to the torso of the fisherman so as to allow the fisherman to hold the fishing rod handle from under the handle.

14 Claims, 12 Drawing Sheets

ARM CRADLE FOR FISHING ROD

RELATED APPLICATION

The present invention is a continuation-in-part application of patent application Ser. No. 09/427,408, filed on Oct. 25, 1999, now U.S. Pat. No. 6,295,755.

FIELD OF THE INVENTION

The present invention relates generally to fishing rods and in particular to spinning-type fishing rods.

DESCRIPTION OF THE PRIOR ART

A spinning-type fishing rod has a long, flexible rod that creates unusual stresses on the arm of the fisherman when a fish has struck the bait and the fisherman must both fight the strength of the struggling fish and eventually struggle to reel in the fish. The arm of the fisherman is aligned at an unnatural angle during the time of maximum leverage when the rod is being pulled upwardly during a strike and likewise during the time the fisherman is reeling in the fish. Stresses are typically concentrated on the forearm of the fisherman and in particular in the wrist area of the forearm. It is apparent that as the forearm of the fisherman becomes aligned with the handle of the rod, the wrist area becomes bent at an angle relative to the rest of the forearm as pressure grows during strike activity and the fishing rod is being pulled upwardly so that unusual stress is concentrated at the sharply bent wrist, which restricts blood circulation at the wrist.

Prior art that has attempted to overcome the problem of forearm and wrist stress while fishing with a spinning rod includes patents that have the object of supporting the forearm of a fisherman holding a long fishing rod. U.S. Pat. No. 4,014,129 issued to Capra on Mar. 29, 1977, provides a fishing rod stabilizing handle which directly replaces the conventional posterior rod handle of the spinning rod or which is configured as an attachment for engagement to the conventional posterior handle. The rod stabilizing handle of is a broad upwardly directed elongate surface projecting from one side of the handle for alignment with and direct engagement of a substantial length of the underside of the forearm portion of the fisherman. U.S. Pat. No. 5,390,438, issued to Warren, Jr. on Feb. 23, 1995, describes an arm support for stabilizing a fishing rod on the arm of a fisherman and for removing at least some of the playing pressure of a fish or heavy lures from the fisherman's wrist while the fisherman is playing the fish on a fishing line extending from a reel mounted on the fishing rod, which arm support includes an elongated straight portion which protrudes rearwardly from fixed or removable attachment to the handle of the fish rod and a generally C-shaped curved portion including multiple, short, straight rod segments connected together and shaped to fit beneath the forearm of the fisherman. One end of the curved portion is positioned under the fisherman's wrist and the other end is located under the forearm so that the curved portion exerts pressure upwardly against the fisherman's wrist and forearm. U.S. Pat. No. 5,313,735 issued to Latouch on May 24, 1994 discloses a splined shaft 22 glued or otherwise affixed to a fishing rod handle 12 and an arm bearing extension 16 having a splined coupling 22 splined onto splined shaft 22. Splines that run on the outside of added shaft 12 cooperate with splines that run on the inside surface of a cylindrical hole to prevent rotation of the fishing rod relative to the extension. The rod can be withdrawn from the extension and rotated and then be reinserted into spline locking relationship with the extension at a new orientation. The necessity of having a special splined shaft 22 more or less permanently affixed to the fishing rod handle greatly limits the range of usability of the Latouch invention. U.S. Pat. No. 3,372,510 issued to Arsenault on Mar. 12, 1968, discloses a hand grip and an arm support disposed in the axial direction of a fishing rod and connected to the rod handle.

My prior application Ser. No. 427,408 describes a device supporting the arm of a fisherman using a spinning-type fishing rod having a cylindrical rod handle comprising an adjustable rotatable arm cradle supporting the upper forearm of the fisherman, a partially cylindrical elongated handle support member defining a partially cylindrical compartment that holds a selected area of the fishing rod handle in alignment with the arm cradle, an adjustable post connecting the arm cradle means with the handle, and an adjustable clamp for removably gripping the rod handle to the handle support. The arm cradle is rotatable to a selected angle relative to the rod handle and is removably lockable at the selected angle. The connecting post can be lengthened or shortened to a selected position and removably locked at that position. The clamp that presses the fishing rod handle against the top of the holding compartment of the handle support member is adjustable by means of a vertical screw that raises or lowers the clamp.

My prior application Ser. No. 427,408 is incorporated by reference into the present application.

The present invention provides a device supporting the arm of a fisherman using a spinning-type fishing rod having a cylindrical rod handle providing a gripping area for the hand of the fisherman that comprises a cradle member supporting the upper forearm of the fisherman and a rod handle support member holding the fishing rod handle in alignment with the cradle member. The rod handle support member is positioned below and rotatably connected with the cradle member about a horizontal axis of rotation. The handle support member and the cradle member are each rotable about the horizontal axis to a plurality of positions in response to pressure applied to said cradle member and the rod handle support member. A clamp attached to the rod handle support member removably grips the rod handle to the handle support member. Self-adjusting positioning means both locks said cradle means with the handle support member at any of a plurality of positions at a locked position wherein the forearm is in a comfort zone and further unlocks the cradle member and the handle support member from the locked position both in response to pressure exerted by the forearm to find a new comfort zone and in response to pressure associated with the fishing rod during fishing that in turn exerts pressure on the rod handle support member. The fishing rod handle gripping compartment and the arm cradle compartment each have an axis positioned in a vertical planes that are offset from one another with the vertical plane of the cradle compartment being nearer to the torso of the fisherman so as to allow the fisherman to hold the fishing rod handle from under the handle.

My present application differs from my prior application Ser. No. 427,408 in several respects. Primarily, the ergonomics of my present invention has been improved relative to my prior application. For example, my present application includes an adjusting swivel that provides automatic rotation of the arm cradle portion relative to the rod-gripping portion. The automatically adjusting arm cradle is advantageous in two ways: first, the arm cradle automatically rotates to a new locking position in response to pressure being exerted by the fisherman's arm at any time during fishing, particularly in response to pressure exerted during a strike; second, the arm cradle automatically rotates to the most comfortable locking position in accordance with the size of the forearm of the user. It is noted that the automatic swivel differs significantly from my prior application, which describes a manually adjustable arm cradle angle relative to the fishing rod that increases the comfort level for the fisherman. Another difference from my prior application is the elimination of the manual vertical adjustment of the arm cradle portion relative to the rod-holding portion described in my prior application. This improvement is made possible by the automatically adjusting swivel of the present invention. Furthermore, my present application has positioned the center-lines of the rod-gripping portion and the arm cradle portions at a slight offset so that the palm of the hand of the fisherman can be placed under the rod grip during use, thus increasing the ability to the fisherman to hold the fishing rod in an extended position for a longer period of time. A further feature of my present invention is that the arm cradle portion and the rod-gripping portion can be easily disassembled and placed into a fishing box and then assembled at site.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

DETAILED DESCRIPTION OF THE INVENTION

Figure 1:
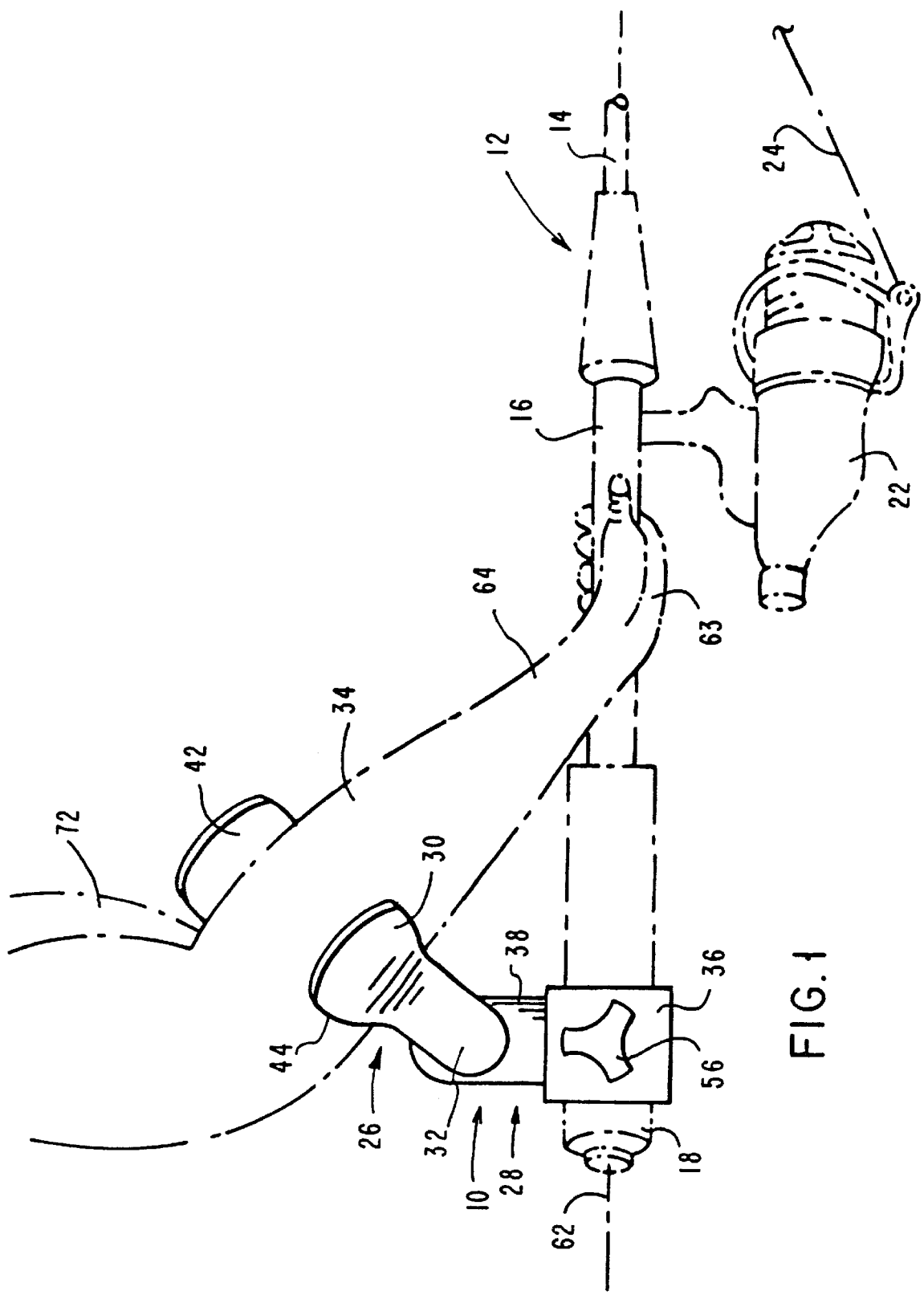
FIG. 1 is a side elevational view of an adjustable arm support device for a fisherman in accordance with the present invention holding a spinning-type casting rod with portions of the fisherman, the fishing rod and spinner shown in phantom line, and an arm cradle supporting the forearm with the hand of the fisherman holding the handle of the fishing rod in the palm of the hand.

Reference is now made to the drawings and in particular to FIGS. 1–12 in which identical or similar parts are designated by the same reference numerals throughout.

FIG. 1 shows an adjustable arm support device 10 supporting the arm of a fisherman using a spinning-type fishing rod 12 including a long metal rod 14, partially shown, and a cylindrical rod handle grip 16 connected to long rod 14 and a rod handle butt 18 positioned rearward of rod handle grip 16 each having handle cylindrical axis 20 and a line reel 22 positioned below rod handle grip 6 connected to a fishing line 24 that is clamped to rod handle grip 16 in a manner known in the art. Cylindrical axis 20 is shown in FIG. 1 as horizontal for purposes of exposition but can be aligned at a plurality of angles relative to the horizontal in a manner that will explained.

Arm support device 10, which is also shown in FIGS. 2–8 in entirety, comprises a cradle member 26 and a fishing rod handle support member 28. Cradle member 26 is rotatably secured to a fishing rod handle support member 28, both of which are also clearly seen in FIG. 3 in the disassembled view of adjustable arm support device 10.

Cradle member 26 includes an elongated arm cradle 30 and a cradle flange 32 unitary with the lower portion of arm cradle 30. Arm cradle 30 supports the upper forearm 34 of the fisherman, which in turn is lateral to the orientation of fishing rod 12. FIG. 1 indicates that forearm 34 is the right forearm of the fisherman, but adjustable arm support device 10 as shown in FIGS. 1–11 is also mountable with the left forearm of a fisherman when arm support device 10 exactly as shown in the figures is reversed. When the left forearm of the fisherman is supported by arm support device 10, certain portions of device 10 are also reversed but device 10 is nonetheless operable at the left arm as well as the right arm as will be explained in detail later.

Fishing rod support member 28 includes a rod handle support 36 and a rod handle support flange 38 that is positioned above and unitary with rod handle support 36. Rod handle support flange 38 is rotatably connected to cradle flange 32 in a manner that will be explained in detail below. Rod handle support member 36 defines a handle holding compartment 40 that includes a convex arcuate handle holding compartment side wall 42 and an opposed convex arcuate handle compartment side wall 44 grip 16.

Rod handle support member 28 further includes a clamp mechanism 46 that comprises a convex arcuate clamp wall 48 that is in convex arcuate alignment with compartment side wall 44, which defines a horizontal threaded bore 50. Clamp mechanism 46 further includes a threaded bolt 52 having a fastening end 54 and an opposed bolt head hand grip 56. Bolt 52 threadably extends through bore 50 with bolt fastening end 54 being secured to the center of clamp wall 48 in a manner known in the art, for example, by press fit. Bolt head hand grip 56 is positioned external to handle holding compartment 40 and in particular external to compartment side wall 44. Bolt head hand grip 56 is triangular in configuration so as to provide a hand grip for a fisherman for rotating bolt 52 in threaded bore 50 so that bolt 52 is threadably movable in selected inward or outward directions. Hand grip 56 can also be a knurled head, or thumb wheel, and can have other configurations such as a butterfly-type hand grip. When bolt 52 is threaded in the inward direction, bolt 52 presses clamp wall 48 inwardly so that fishing rod handle 16 is in a gripped position between arcuate compartment side wall 42 and clamp wall 48 in a rod handle cylindrical gripping compartment 58. When bolt 52 is threaded in the outward direction, clamp wall 48 is drawn outwardly away from rod handle 16 so that gripping compartment 58 as such is eliminated with the result that fishing rod 12 is free to be removed from handle holding compartment 40. A bolt locking nut 57 is threaded onto bolt 52 and positioned external to handle holding member outer side wall 44.

Rod handle support member 36 defines an aperture 59 that opens into handle holding compartment 40. Handle holding compartment side walls 42 and 44 have linear opposed lower edges 60A and 60B that in particular define aperture 59. The distance between linear lower side edges 60A and 60B is greater than the diameter of rod handle 16, which thus can be positioned in or removed from handle holding compartment 40 by sliding rod handle 16 through side aperture 59. Rod handle 16 can be positioned in holding compartment 40 by backing in butt end 18 into handle holding compartment 40. Fishing rod handle grip 16 has a fishing rod handle diameter $X_1$ indicated in FIG. 4, and handle holding compartment lower linear side edges 60A and 60B are spaced apart at a distance $X_2$ as indicated in FIG. 4 that is greater than the diameter of the diameter of fishing rod handle butt 18.

Figure 4:
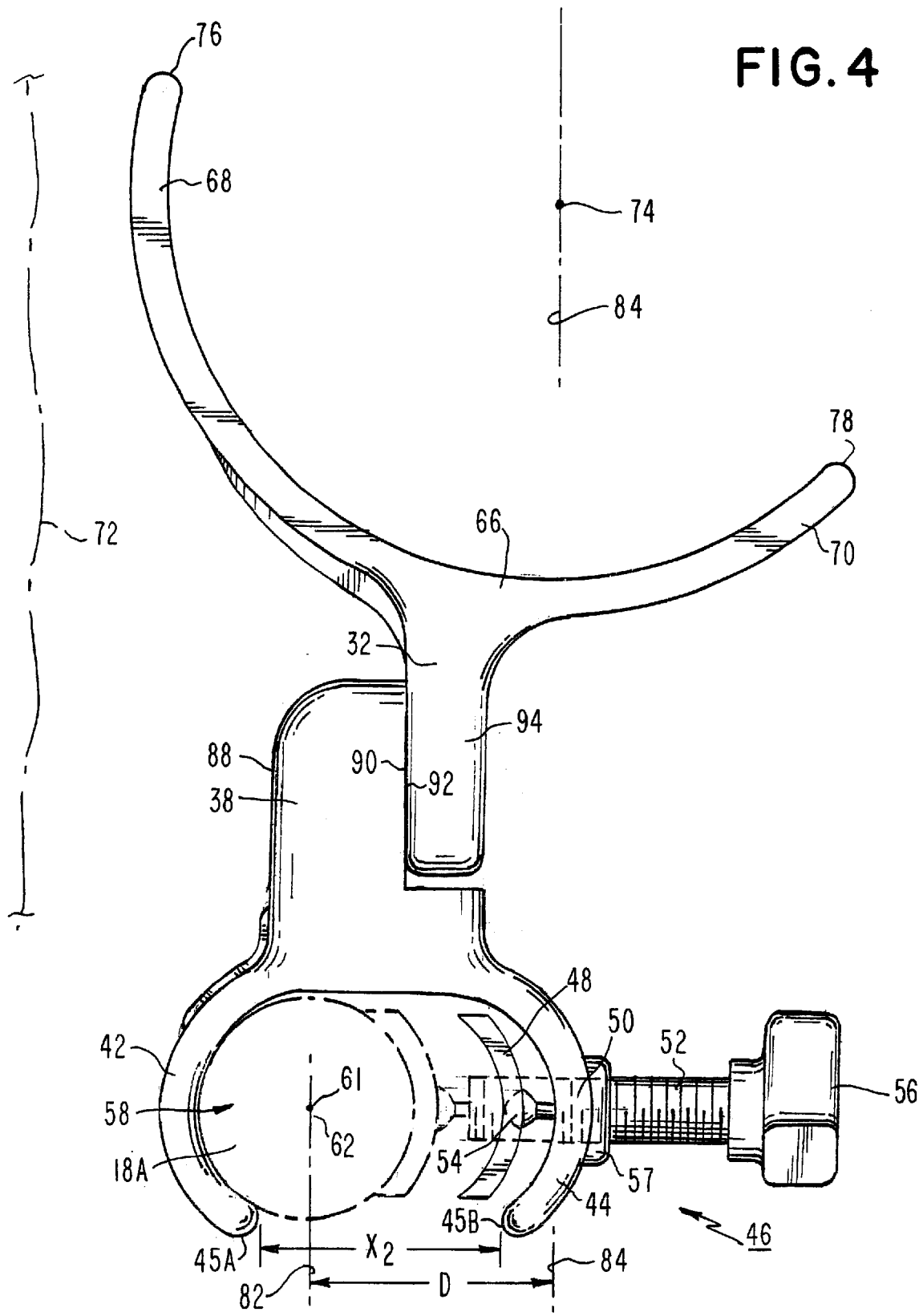
FIG. 4 is a rear view of the adjustable arm support shown in FIGS. 1, 2, and 3 in an assembled mode with the fishing rod handle shown in phantom line being gripped by the rod clamp also shown in phantom line and further showing the offset between the arm cradle member and the rod handle support member.

As seen in FIG. 4 and as shown in phantom line, rod handle 16 is positioned in gripping compartment 58, which is a subarea, or portion, of handle holding compartment 40 and which has a gripping compartment axis 61. Gripping compartment 58 is defined by handle holding compartment side wall 42 and arcuate clamp wall 48, shown in phantom line when clamp wall has been positioned towards rod handle butt 18A by threading bolt 52 inwards. Rod handle butt 18A has a rod handle axis 62 that is coextensive with gripping compartment axis 61. As seen in FIGS. 1 and 4, the hand 63 of the fisherman holds rod handle grip 16 with the wrist 64 of the fisherman positioned directly under rod handle grip 16.

Figure 2:
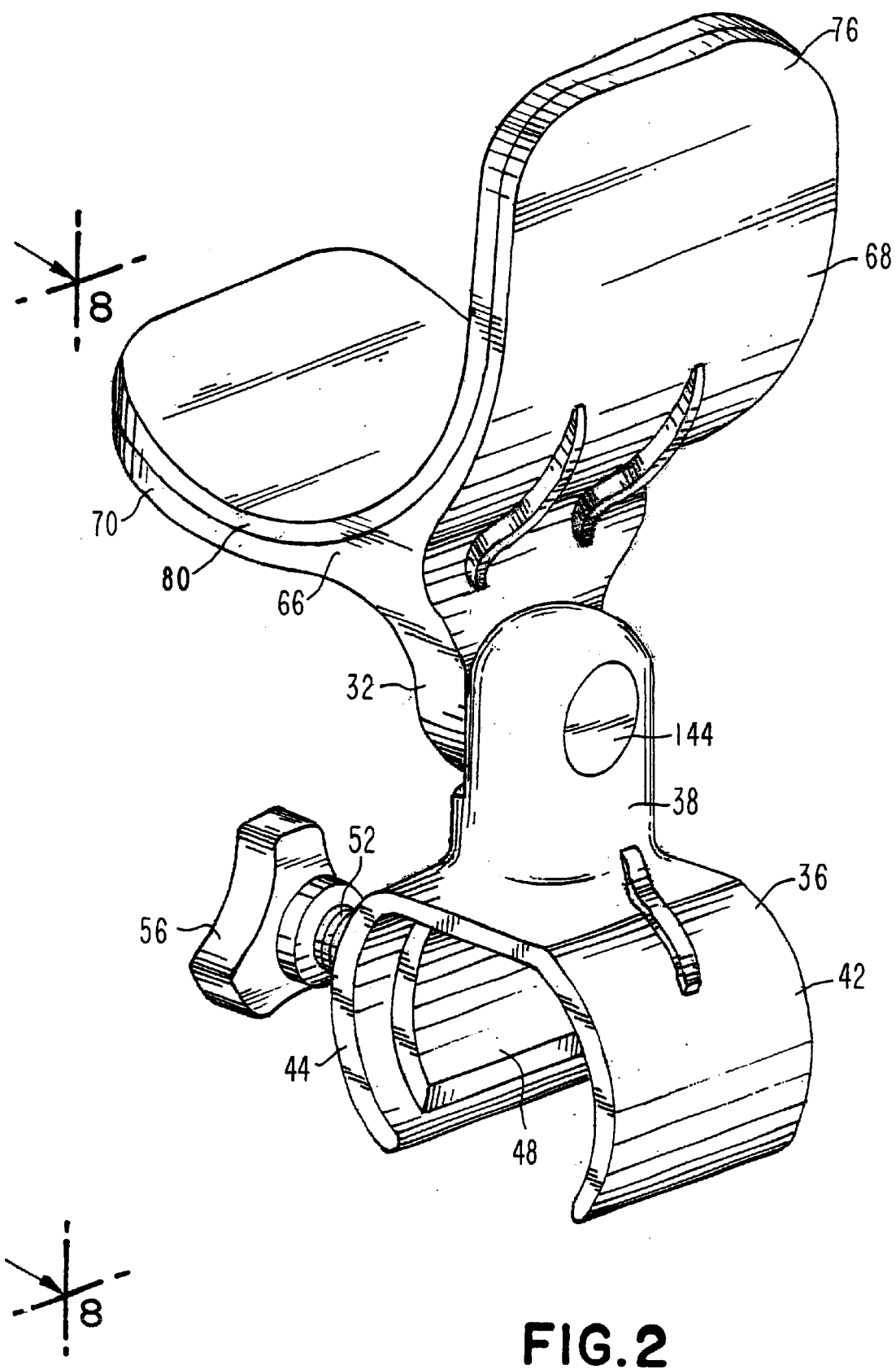
FIG. 2 is a perspective view of the adjustable arm support in an assembled mode seen generally as a front view.
Figure 3:
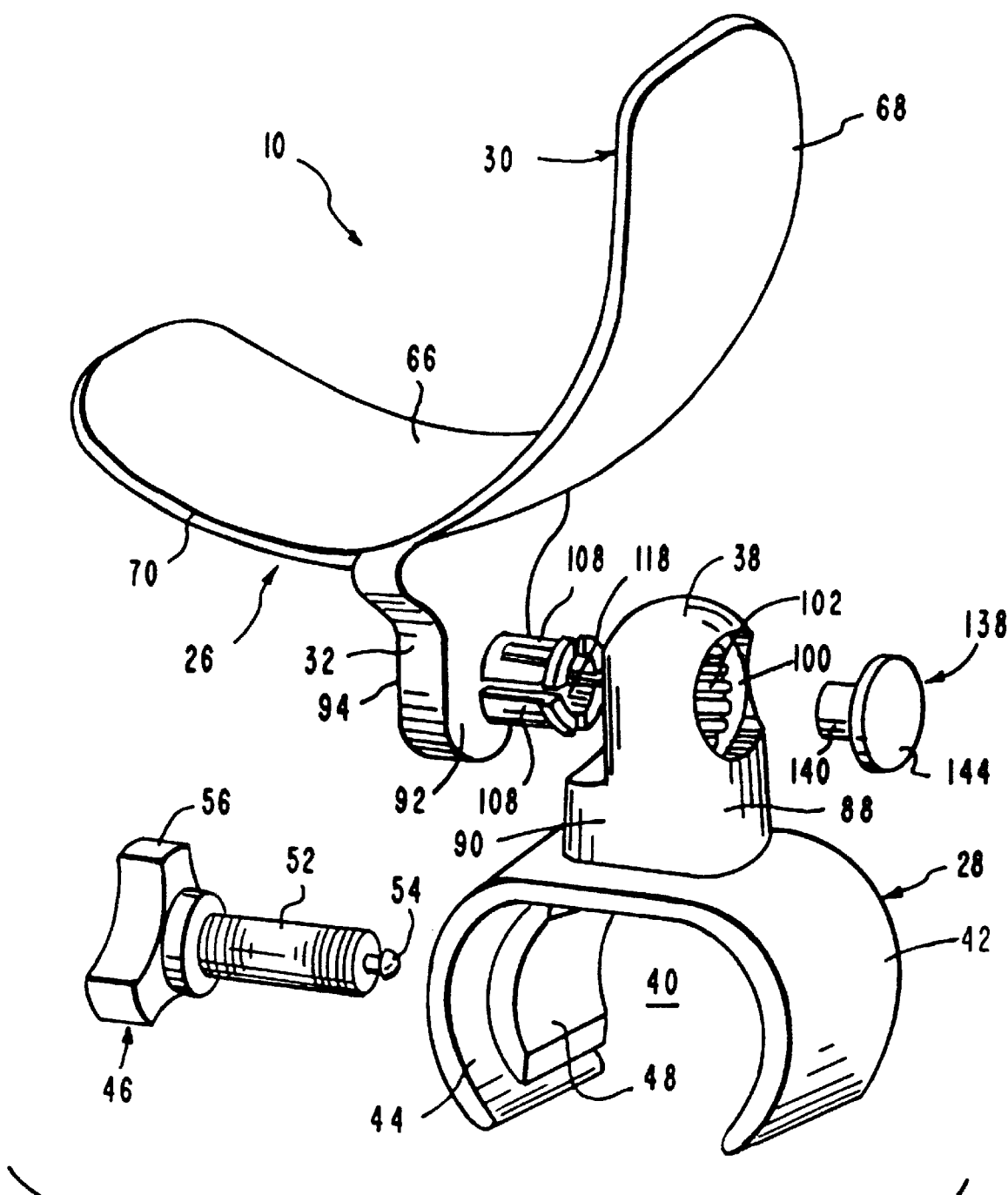
FIG. 3 is an exploded perspective, or disassembled, view taken generally as a front view of the adjustable arm support device shown in FIGS. 1 and 2.

Arm cradle 30, shown in FIG. 1 holding forearm 34, is also shown in the disassembled view of adjustable arm support device 10 in FIG. 3 and in the assembled view of adjustable arm support device 10 in FIGS. 2 and 4–8, comprises an arm cradle arced bottom portion 66 and a pair of opposed cradle inner and outer arced side wall portions 68 and 70, respectively, as positioned relative to torso 72 and which extend lateral to fishing rod 12. Cradle inner and outer side wall portions 68 and 70 extend upwardly from their respective opposed sides of cradle bottom portion 66 so as together to form a partial cylinder having a cradle axis 74. Cradle inner side wall portion 68 has an inner linear top edge 76 and cradle outer side arm portion 70 has an outer linear top edge 78. Inner top edge 76 is significantly higher than outer top edge 78, that is, side wall portion 68 is higher that side wall portion 70. Because pressure exerted by forearm 34 is naturally directed transversely toward torso 72, inner side wall portion 68 is preferably higher than outer side wall portion 70 so as to resist such lateral pressure.

A cradle cushion 80 is attached to the top side of cradle 26, particularly to the top sides of cradle bottom portion 66 and cradle inner and outer side wall portions 68 and 70. Cradle cushion 80 can be made of any suitable cushion material such as foam plastic with a waterproof cover. It is noted that self-adjusting arm support device 10 shown in the figures as supporting the right forearm 34 of a fisherman can also be reversed so as to support the left forearm of the fisherman (not shown). When device 10 reversed from the right arm to the left arm, cradle inner side wall portion 68 is again positioned adjacent to the torso 72 of the fisherman with the result that the higher cradle inner linear top edge 78 is positioned adjacent to the arm of the fisherman just as shown in the figures for the right arm positioning. In addition, clamp mechanism 46 is likewise positioned in the position away from torso 72 in the mirror image of the position of device 10 as shown throughout the figures. The net result is that adjusting arm support device 10 as shown in the figures is usable for the right arm exactly as shown for the left arm in the figures with no change of design.

As shown in FIG. 4, rod handle gripping compartment axis 61 lies in a vertical gripping compartment axis plane 82 and cradle axis 74 lies in a vertical cradle axis plane 84 that is generally parallel to and horizontally distanced from vertical gripping compartment axis plane 82. Vertical cradle axis plane 84, which is in general the center of the cross-section of forearm 34 of the fisherman, is located between torso 72 of the fisherman and vertical gripping compartment axis plane 82. Vertical cradle axis plane 84 and vertical gripping department compartment axis plane 82 are positioned at an offset distance D from one another. Thus, forearm 34 extends lateral to fishing rod 12 at transverse offset distance D from fishing rod 14 thus providing the structure that allows wrist 64 to be positioned outwardly from rod handle 16 relative to torso 72 so that hand 63 is naturally placed and wrapped around the underside of rod handle 16 to support the downward pressure from rod 14 as shown in FIG. 1. Thus, offset D provides the fisherman with the ergonomic advantage of supporting fishing rod 12 by way of hand 63 being positioned underneath rod 12. Offset distance D is slight and is intended not only to increase the comfort level of forearm 34, wrist 64 and hand 63 of the fisherman but also to increase the ergonomic efficiency of the body structure relative to holding fishing rod 12. The range of offset distance D can vary in accordance with the size of the fisherman, particularly forearm 34, wrist 64 and hand 63, but in general distance D can range between approximately ½ inch to 1 ¾ inch. A more preferred range is from about ¾" to 1 ¼". For example, an offset distance of about one inch can be provided.

A self-adjusting positioning mechanism 86 pivotably connects cradle member 26 with rod handle support member 28 providing mutual rotational capability between cradle member 26 and rod handle support member 28 between a plurality of rotational positions as will be explained. Self-adjusting positioning mechanism 86 is responsive to pressures on both cradle member 26 and rod handle support member 28. First, pressure on fishing rod 12 has the effect of lowering or raising fishing rod 12 in a vertical plane around self-adjusting positioning mechanism 86. Second, pressure upon or exerted by forearm 34 has the effect of lowering or raising forearm 34 in a vertical plane around self-adjusting positioning mechanism 86.

Self-adjusting positioning mechanism 86 includes pole handle support flange 38 (see FIG. 3) having opposed handle support flange inner and outer walls 88 and 90, respectively, with the terms inner and outer being defined as relative to torso 72, and further includes cradle flange 32 as having opposed cradle flange inner and outer walls 92 and 94, respectively, with the terms inner and outer being defined as relative to torso 72. As seen in FIG. 4, handle support member flange inner wall 88 is in juxtaposition with cradle support member flange outer wall 94. Handle support flange 38 defines a handle support member cylindrical chamber 96 having a handle support member chamber horizontal axis 98 extending transversely between inner and outer walls 88 and 90.

Figure 5:
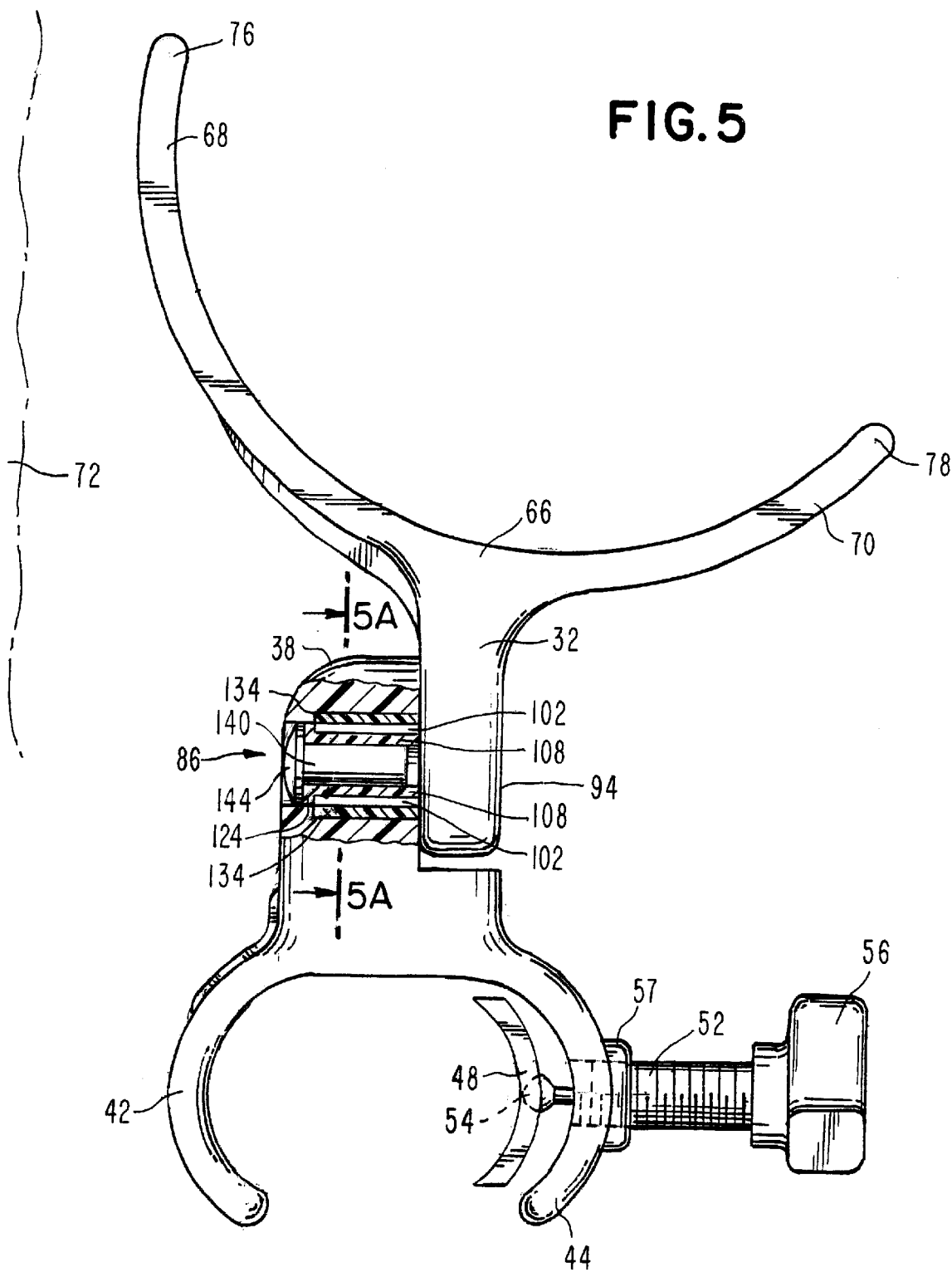
FIG. 5 is a rear view of the adjustable arm support similar to the view shown in FIG. 4 with a portion of the swivel wall having been stripped away revealing the inner structure of the automatic swivel including the biasable fingers and the swivel teeth and also showing the resilient plug.
Figure 9:
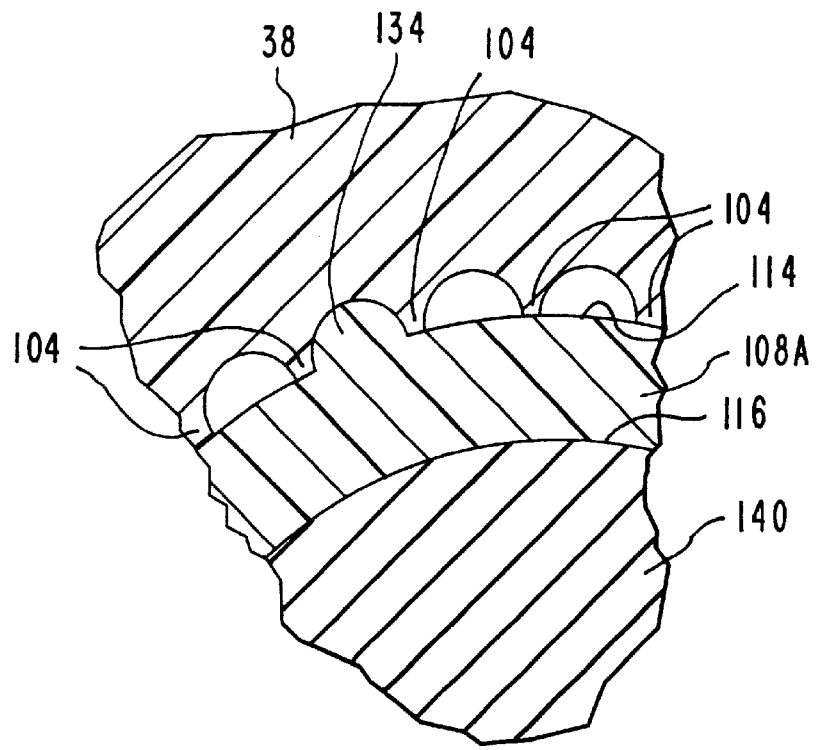
FIG. 9 is an isolated enlarged view of a portion of the cross-sectional view of FIG. 5A showing one of the locking ribs of one of the biasable fingers engaged with the teeth of the swivel.
Figure 9A:
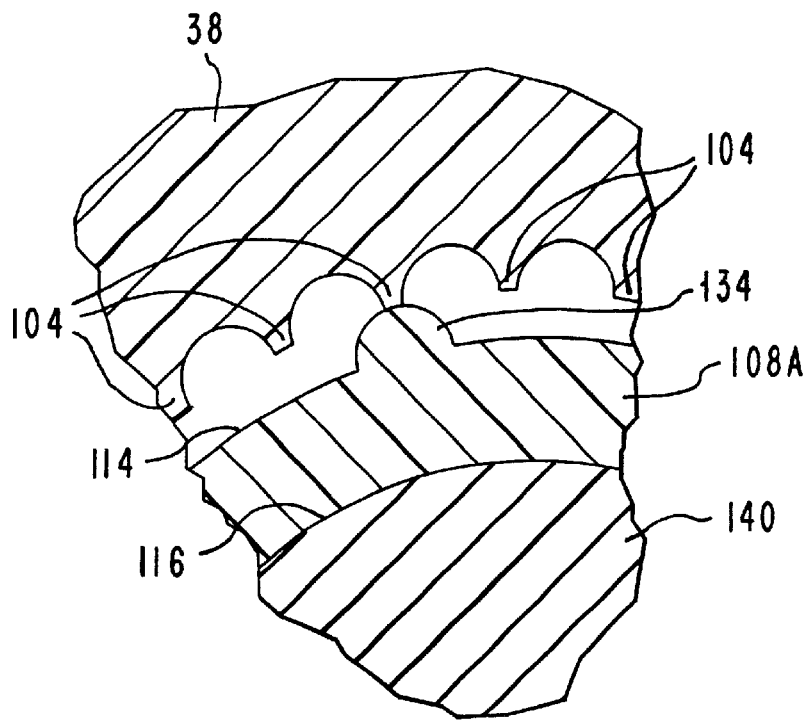
FIG. 9A shows a view similar to the cross-sectional view of FIG. 8 with the cradle having been slightly rotated towards a new looking position and the biasable finger shown in FIG. 9 being rotated to a new locking position so that the locking rib shown in FIG. 9 is temporarily positioned at the crown of one of the swivel teeth with the biasable rib in a temporary biased mode pressing into the resilient rubber plug which itself is being biased.

Self-adjusting positioning mechanism 86 as seen in FIGS. 5 and particularly 5A and also FIGS. 9, and 9A, also includes handle support member cylindrical chamber 96 having an inner cylindrical wall 100 that defines a plurality of parallel teeth 102 shown as 28 teeth in number for purposes of exposition only. As seen in FIGS. 9 and 9A, parallel teeth 102 have peaks 104 and valleys 106 in parallel alignment with handle support member chamber axis 98. Peaks 104 taken together generally define inner cylindrical chamber wall 100. Peaks 105 have flat apexes. Valleys 106 are suitably shaped in the form a U or V.

Figure 5A:
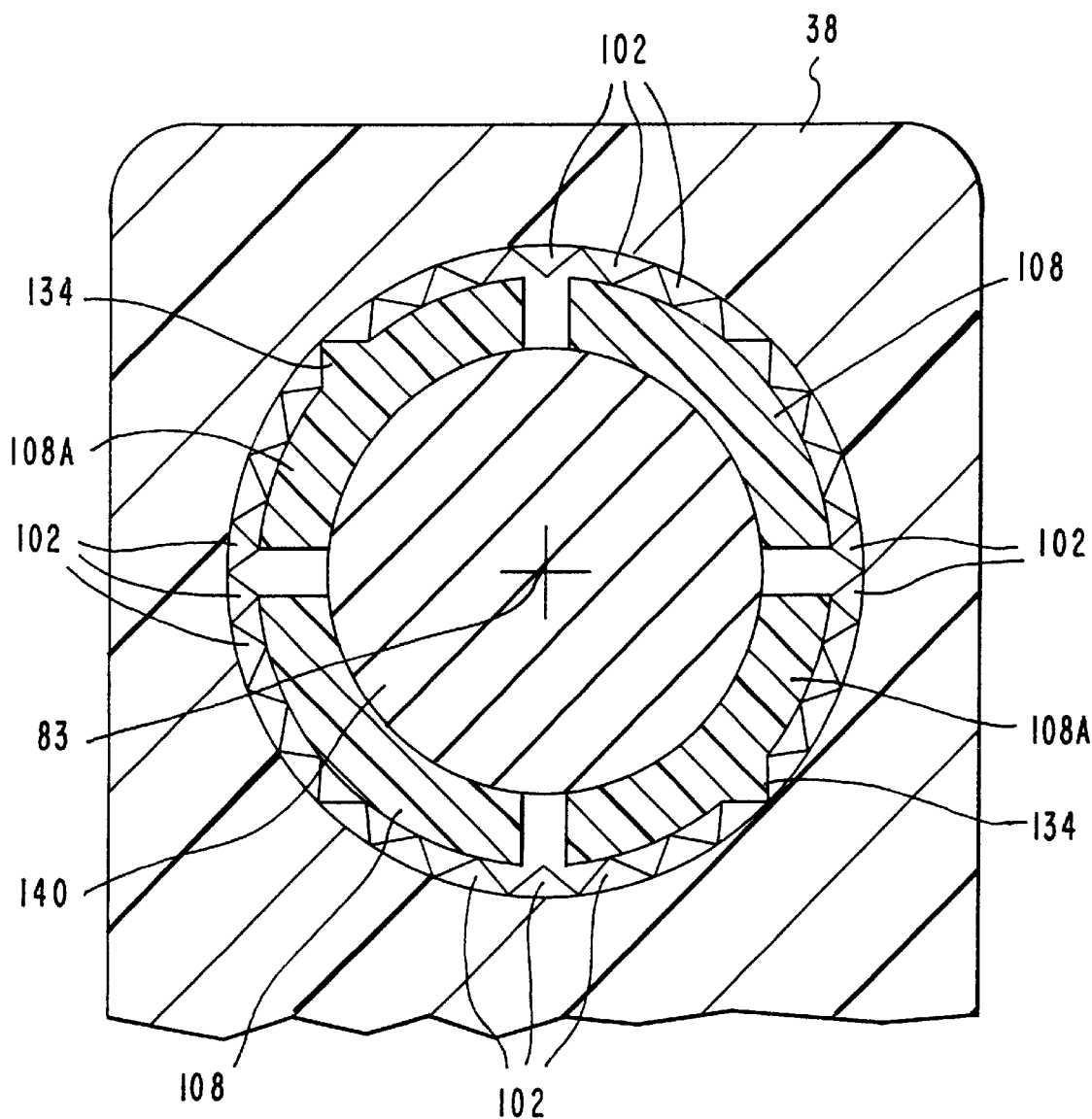
FIG. 5A is a cross-sectional view taken through line 5A—5A of FIG. 5.
Figure 6:
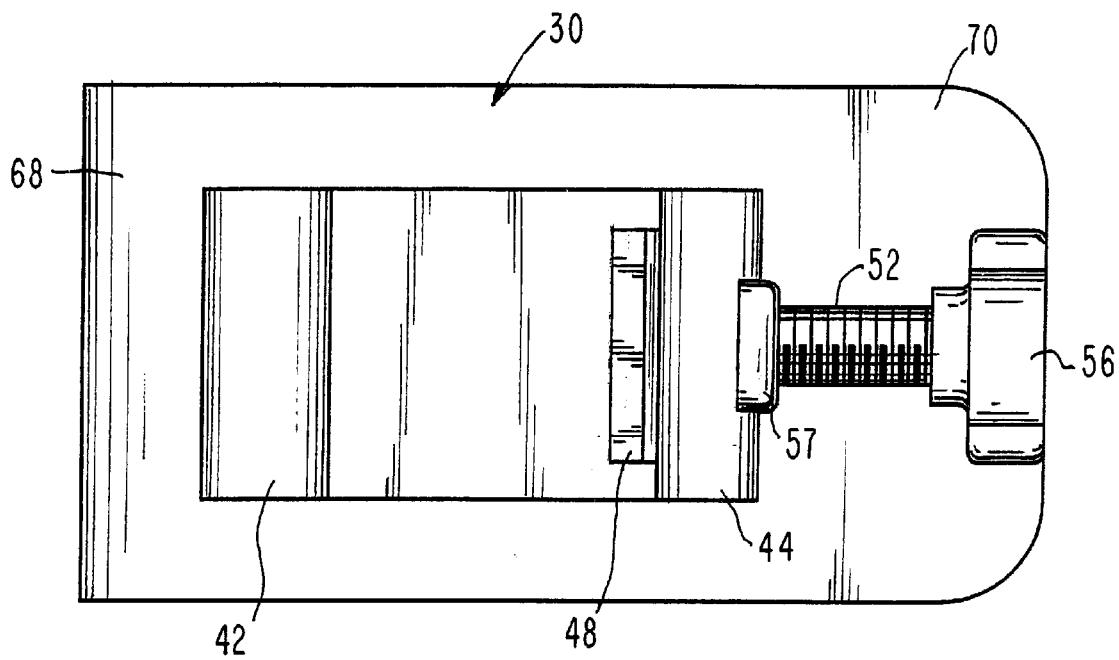
FIG. 6 is a bottom view of the adjustable arm support.
Figure 7:
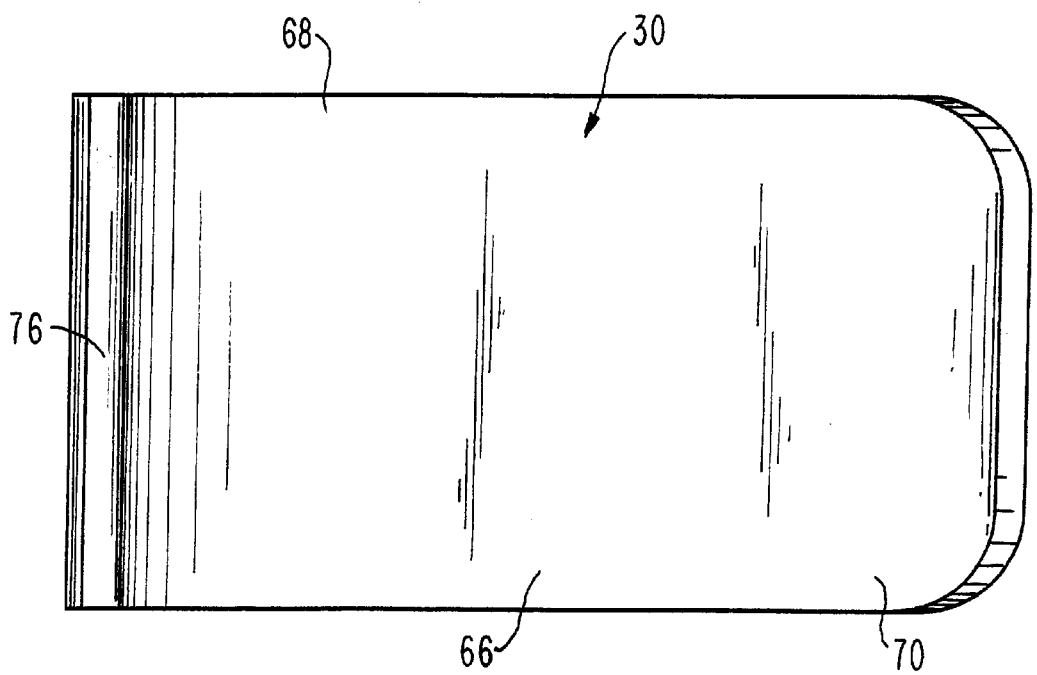
FIG. 7 is top view of the adjustable arm support.
Figure 8:
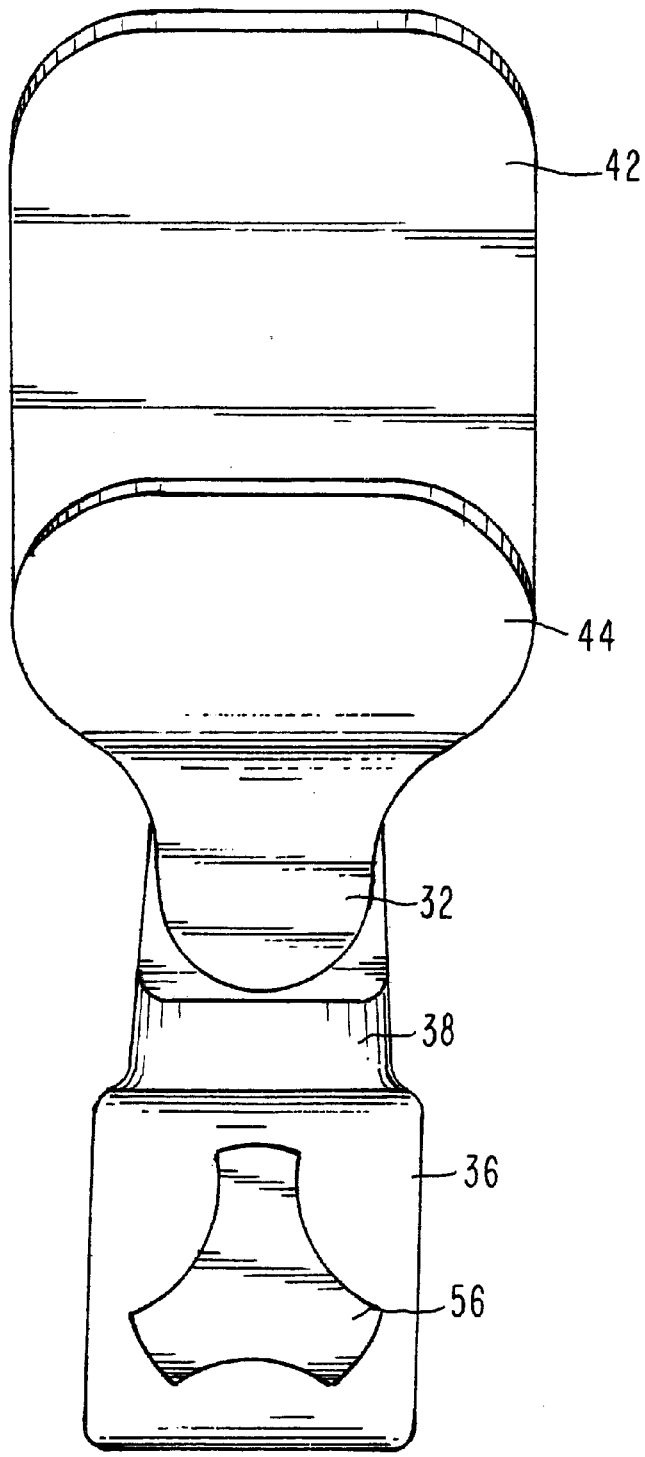
FIG. 8 is a side view taken through plane 8—8 of FIG. 2.
Figure 10:
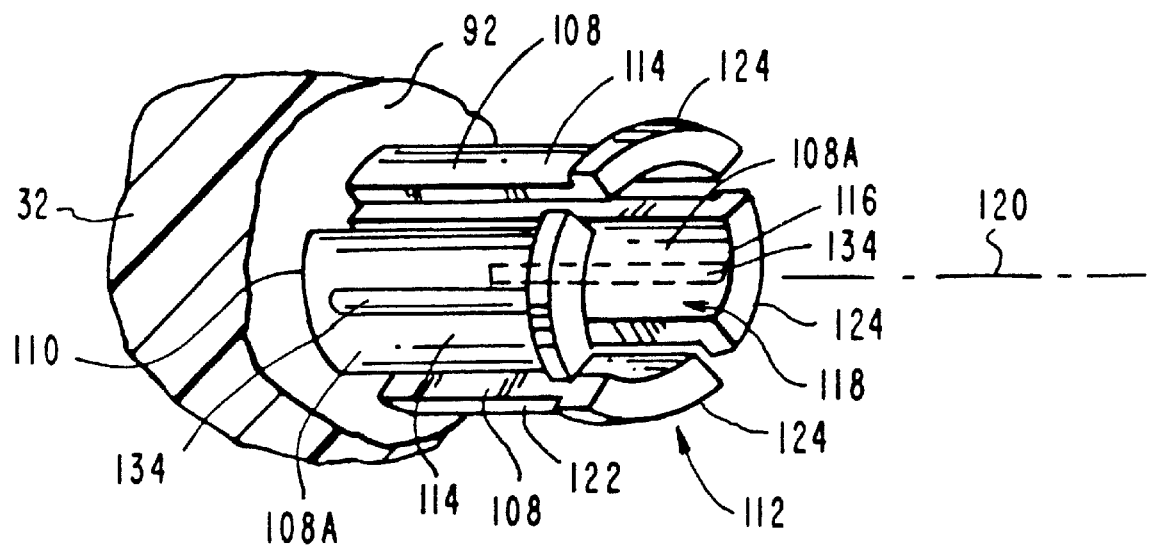
FIG. 10 shows in isolation the set of four biasable locking fingers each integral with the lower flange of the cradle shown in a cutaway view with two of the locking fingers having elongated locking ribs for engagement with the teeth of the swivel.
Figure 11:
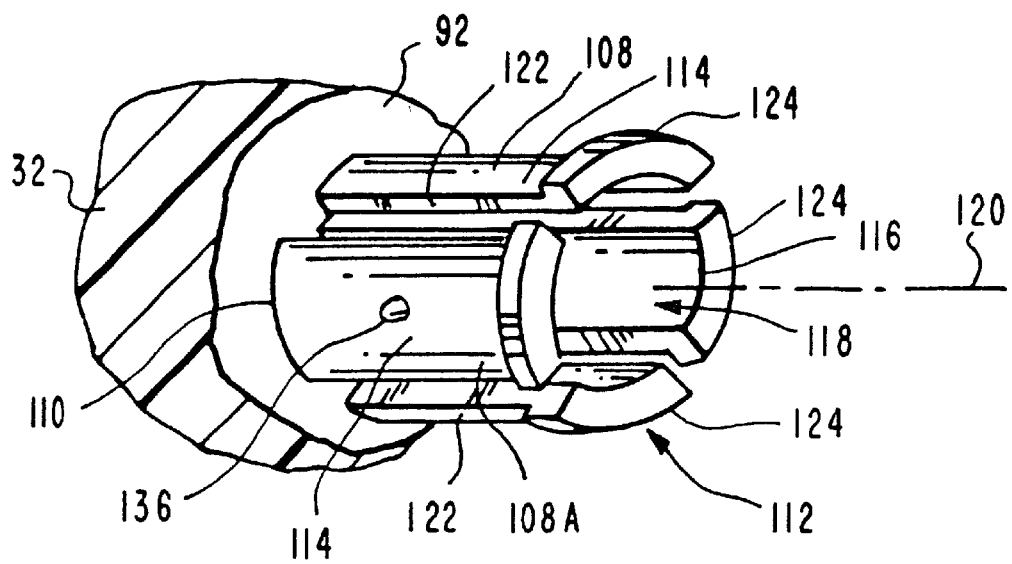
FIG. 11 shows in isolation a view analogous to the view shown in FIG. 10 with two of the locking teeth having locking pins for engagement with the teeth of the swivel.

As shown in isolation in FIGS. 3 and 5A and in alternate configurations in FIGS. 10 and 11, cradle member 26 includes a plurality of biasable fingers 108 shown as four in number at 90° intervals for purposes of exposition only and that can vary in number from those shown. Each biasable finger 108 has a finger connected end 110 joined to cradle support member flange inner wall 92 and an opposed finger free end 112. Bisasable fingers 108 are separated from one another so that free ends 112 are movable between an unbiased mode as shown in FIG. 9 and a biased mode as shown in FIG. 9A.

Figure 12:
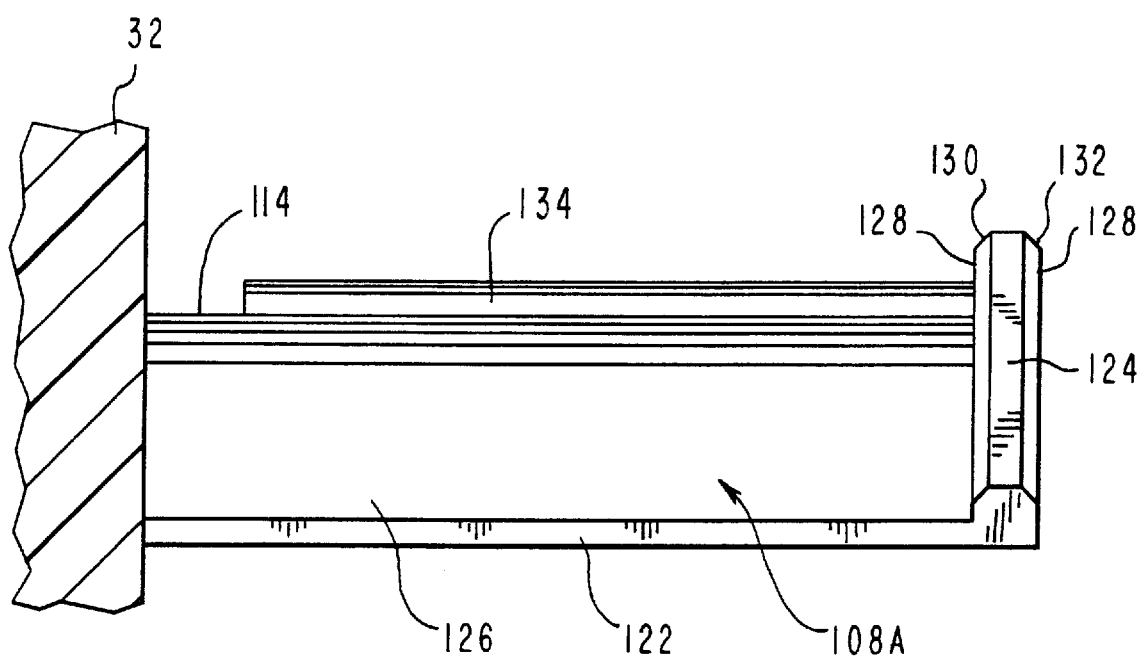
FIG. 12 is a view taken through plane 12—12 of FIG. 10.

Biasable fingers 108 are positioned within cylindrical chamber 96 in parallel relationship with handle support member chamber axis 98 and to parallel teeth 102. Each biasable finger 108 has a finger outer annular, or arced, surface 114 conformed to fit in contact relationship with inner cylindrical chamber wall 100, that is to say, peaks 104 taken together when biasable fingers 108 are in their unbiased mode. Each biasable finger 108 further has a finger inner arced, or annular, surface 116 so that biasable fingers 108 generally define a finger inner cylindrical compartment 118 indicated generally in FIG. 5A. Finger inner cylindrical compartment 118 has a horizontal compartment axis 120 that is aligned with rod support member chamber axis 98 and which together define the rotatable horizontal axis about which cradle member 26 and rod handle support member rotate relative to one another. As also shown in FIGS. 10 and 11, each biasable finger 108 has a pair of opposed inwardly extending flat side walls 122 each indicated in FIG. 5A that join finger outer and inner annular surfaces 114 and 116 between connected ends 110 and free ends 112. As shown in FIGS. 5, 10, 11 and 12, each biasable finger 108 has an arc-shaped finger flange 124 at each finger free end 112. As best seen in FIG. 12, a finger flange 124 representative of the four finger flanges 124 has a curved outer wall 126 and a flat end wall 128. Each finger flange 124 further has an inner taper 130 between finger outer annular surface 114 and flange outer wall 126 and a circumferential outer taper 132 between flange outer wall 126 and flange flat end wall 128.

Two opposed fingers 108, that is, two fingers 108 at 180° from one another, also additionally designated as fingers 108A in FIGS. 10 and 12, each include an elongated projecting element 134 that is connected to each outer annular surface 114 and that extends between each connected end 110 and each free end 112. Each elongated projecting element 134 is linear and oval in cross-section in configuration and extends parallel to handle support member chamber axis 98 and also to parallel teeth 102 between each finger connected end 110 and to each finger free end 112 in particular to each finger flange 124.

An alternate projecting clement 136 shown in FIG. 11 is configured as a cylindrical button, or pin, projecting element that is connected to opposed biasable fingers 112 also designated in particular as biasable fingers 108B positioned on each outer annular surface 114 approximately midway between finger connected end 110 and finger free end 112. Pins 136 have oval apexes.

Figure 13:
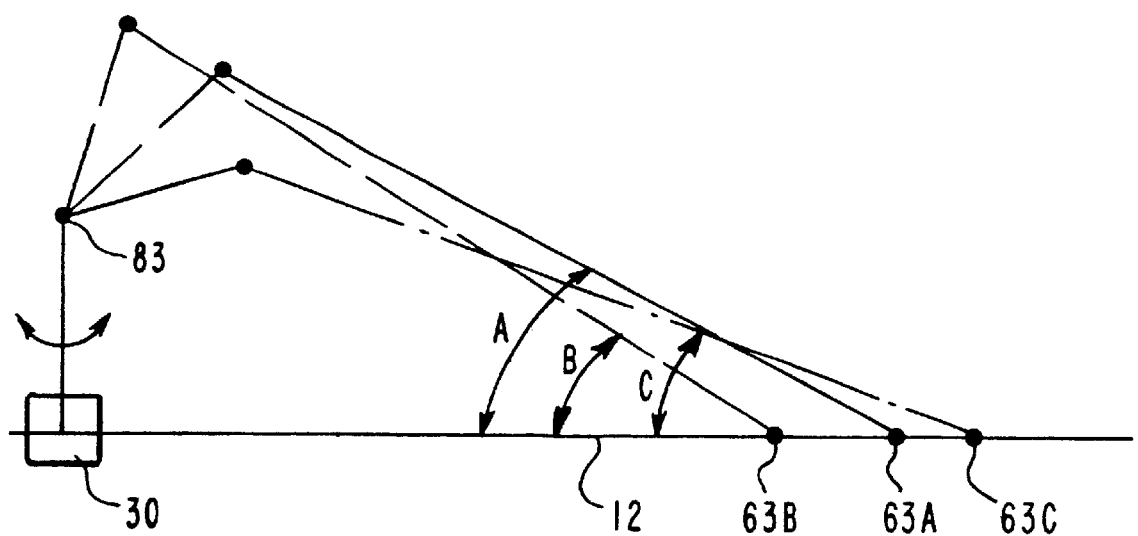
FIG. 13 is an abstract side view illustrating various possible angles between cradle member 26 and rod handle support member 28.

As shown in FIGS. 9 and 9A, which are detailed areas of FIG. 10 showing elongated projecting element 134 and also of FIG. 11 showing button projecting element 134, each biasable finger 108 and in particular each biasable finger 108A or 108B is movable between an unbiased position as shown in FIG. 9 and a biased position as shown in FIG. 9A. In the unbiased position of fingers 108A and 108B, each of the two projecting elements 134 or 136, whichever as the case may be, is in a meshed relationship with teeth 102 in a particular valley 106 of the 30 valleys 106 wherein cradle member 26 and rod handle support member 28 are locked together so that the angle A between cradle member 26 and rod 12 as shown in FIG. 13 remains unchanged.

In the biased mode of fingers 108A and 108B, projecting element 134 or 136, as the case may be, is in an unmeshed relationship with teeth 102 at a particular peak 104 of the 28 peaks 104 wherein cradle member 26 and rod handle support member 28 are free to rotate relative to one another about aligned axes 98 and 120, that is, horizontal rotational axis 83, in response to pressure exerted by forearm 34 or fishing rod 12 to assume a new angle other than the angle A, that is to say, to a new angle that is greater than angle A such as angle B, or a new angle that is less than angle A such as angle C, both of the latter being shown in phantom line. Rotational movement of fishing rod 12 relative to forearm 34 retained by cradle member 26 about horizontal axis 83 caused by pressure initiated by a fish strike is also possible.

The force created by pressure from fishing rod 12 or from cradle member 26 by way of forearm 34 seeking a new comfort zone, or pressures from both sources of pressure, removes projecting element 134 or 136 as the case may be from the particular valley 106 in which it is positioned in the meshed relationship with teeth 102 shown in FIG. 9 for movement in one rotational direction or another about coextensive rod handle support chamber axis 98 and finger compartment axis 120 in response to the particular direction of the pressure. The biasing pressure that is required to move both projecting elements 134 or both projecting elements 136 from the valleys 106 in which they are positioned in the unbiased mode to a pair of particular peaks 104 must be sufficiently strong to overcome the self-bias of fingers 108A, or 108B, and to place fingers 108A, or 108B, in their biased mode so as to assume the unmeshed relationship of teeth 102 and biasable fingers 108A or 108B shown in FIG. 9A. Resistance to any change of the meshed relationship between teeth 102 and biasable fingers 108A and 108B to an unmeshed relationship is measured by the degree of resistance to being moved from an unbiased mode to a biased mode as provided for in the design of biasable fingers 108. Biasable fingers 108 can be made of any biasable material such as certain biasable metals or plastics. Biasable fingers 112 are so constructed and arranged that the resistance to being moved in the manner of springs to a biased mode is such that the angle A shown in FIG. 13 between fingers 108 and teeth 102 is maintained in a stable mode and only changed when the comfort zone of the forearm 34, wrist 64, and hand 63, such as that indicated in FIG. 13 as angle A, is challenged and ultimately overcome by external pressures and a new comfort zone is automatically sought so that self-adjustment positioning mechanism 86, characterized by the relationship between biasable fingers 108 and teeth 102, is activated to seek a new comfort zone until a new relationship between biasable fingers 108 and teeth 102 is achieved such as that indicated in FIG. 13 as angle B or angle C at which time the relationship between biasable fingers 108 and teeth 102, that is to say, self-adjusting positioning mechanism 86 itself, is stabilized until a new pressure sufficient to activate self-adjusting positioning mechanism 86 is applied.

As shown in FIG. 2 and in insolation in FIG. 3 and also in FIGS. 5 and 5A, a short plug 138 having a cylindrical plug body 140 and a plug cap 144 is mounted within finger cylindrical compartment 118, which in turn is mounted within cylindrical chamber 96 of rod handle support member flange 38, and plug 138 is made of a resilient material such as rubber or a resilient plastic material. Plug cap 144 overlies the rim of rod support member cylindrical chamber 96 at inner wall 90 rod handle support member support flange 38. As seen in FIGS. 5 and 5A and in detail in FIGS. 9 and 9A, finger inner annular surface 116 is pressed against cylindrical plug body 140. When each projecting element 134 or 136, as the case may be, is forced out of each valley 106 of teeth 102 when the pressure between cradle member 26 and handle support member 28 is such that self-adjusting positioning mechanism 86 becomes activated to the extent that biasable fingers 108A or 108B rotate out of valleys 106 and onto peaks 104 so that finger outer annuular surfaces 114 of biasable fingers 108A or 108B are pressed against and ultimately into resilient plug body 140 with the result that resilient plug body 140 flexes radially inwardly at the areas of mutual contact. As cradle member 26 and handle support member 28 continue to be rotated relative to one another in response to external pressure, biasable fingers 108A and 108B self-bias back into new valleys 106 and resilient plug body 140 thereupon resiliently resumes its former cylindrical configuration. Plug 138 has the function of preventing foreign material such as dirt or other from clogging the relationship between teeth 102 and biasable fingers 108. In addition, plug 134 can have self-biasing capability so as to optionally provide the function of creating additional resistance to undesired early disengagement between cradle member 26 and handle support member 28. Such resistance to disengagement between cradle member 26 and handle support member 28 is in addition to the resistance to such disengagement provided by biasable fingers 108 alone. Thus, added stability to self-adjusting positioning mechanism 86 is provided such that slight or inconsequential pressures do not cause unnecessary and disruptive rotational movement between cradle member 26 and handle support member 28. A locking mechanism (not shown) connected to opposed sides of rod handle support flange 38 at handle support flange inner wall 88 that overlays plug cap 144 and that removably secures plug 138 to handle support member 28 can optionally be provided.

As shown in FIG. 5A, twenty-eight locked rotational positions for self-adjusting positioning mechanism 86 are shown to be 28 rotational positions in FIG. 5A for purpose of exposition only. Cradle positioning mechanism 86 further removably locks and unlocks cradle member 26 at one of the 28 rotational positions relative to rod handle support member 28 in response to pressures exerted by forearm 34 so as to automatically select a comfortable position for forearm 34 in accordance with constantly changing pressures in accordance with external conditions.

Adjustable arm support device 10 can be made of a strong plastic material or a suitable metal, preferably non-corrosive. Cradle member 26 and handle support member 28 are preferably made of the same material. Clamp mechanism 46 including clamp wall 48 and bolt 52 can be made of either plastic or metal.

Adjustable arm support device 10 can be disassembled from the assembled mode as shown, for example, in FIG. 2 to a disassembled mode shown in general in FIG. 3 so that it occupies a smaller storage volume than in the assembled mode thus enabling the disassembled device 10 to be fitted in a fisherman's kit box and then reassembled at a fishing site. Disassembly of device 10 is accomplished as follows. Plug 138 is first removed from finger compartment 118. Cradle member 26 and fishing rod handle support member 28 are pulled apart into the two separate entities as shown in FIG. 3. When finger flanges 124 are pressed against teeth 102, finger flange inner tapers 130 allows finger flanges 124 to slide over teeth 102 whereupon biasable fingers 108 are pressed into biased modes. Upon final removal of finger flanges 124 from handle member inner cylindrical chamber 96, that is, away from teeth 102, biasable fingers 108 spring back into unbiased modes and the separation of cradle member 26 and handle support member 28 is complete. Optional further disassembly of device 10 can include disassembly of clamp mechanism 46 including unthreading bolt 52 from clamp holding compartment outer side wall 44 and further from clamp wall 48.

Fishing rod handle grip 16 has a fishing rod handle diameter $X_1$ indicated in FIG. 4, and handle holding compartment inner side wall 42 has a first lower inwardly extending horned end 45A and handle holding compartment outer side wall 44 has a second lower inwardly extending horned end 45B in opposition to first lower horned end 45A. First and second lower horned ends 45B and 45B are spaced apart at a distance $X_2$ as indicated in FIG. 4 that is greater than the diameter of the diameter of fishing rod grip 16.

Although the present invention has been described in some detail by way of illustration by way of example for purposes of clarity and understanding, it will, of course, be understood that various changes and modifications may be made in the form, details, and arrangements of the parts without departing from the scope of the invention set forth in the following claims.

What is claimed is:

1. A device supporting the arm of a fisherman using a spinning-type fishing rod having a cylindrical rod handle providing a gripping area for a hand of the fisherman, comprising:

cradle means for supporting the upper forearm of the fisherman, rod handle support means for holding the fishing rod handle in alignment with said cradle means, said rod handle support means being positioned below and rotatably connected with said cradle means about a horizontal axis of rotation, said handle support means and said cradle means each being rotatably movable about said horizontal axis to a plurality of positions in response to pressure applied to said cradle means and said rod handle support means, clamping means for removably gripping said rod handle to said handle support means, said clamping means being attached to said rod handle support means, and self-adjusting positioning means operating in response to pressures exerted by said cradle means and said rod handle support means for locking said cradle means with said handle support means at any one of said plurality of positions, and further for unlocking said cradle means and said handle support means from said locked position, wherein said self-adjusting positioning means includes mutually cooperatively associated elements of said cradle means, and said rod handle support means, for being operatively responsive when self-adjusting to said pressure exerted by said cradle means and rod handle support means, without interference of any frictional forces acting on said associated elements; and said self-adjusting positioning means further having a rod handle support member with a flange that forms an inner cylindrical chamber having a chamber axis, and said inner cylindrical chamber having a wall that defines one of said plurality of mutually cooperatively associated elements or parallel teeth having elongated peaks and valleys in alignment with said chamber axis for locking/unlocking engagement with the other said mutually cooperatively associated element.

2. The device according to claim 1, wherein said self-adjusting positioning means further includes said cradle member having a cradle flange and a plurality of biasable fingers each of said fingers having a connected end at said cradle flange and an opposed free end, said plurality of biasable fingers being positioned within said handle support member inner cylindrical chamber, said fingers including outer annular surfaces and inner annular surfaces, each of said inner annular surfaces defining a finger inner cylindrical compartment having a finger compartment axis, said biasable fingers being positioned at equal intervals within said handle support member cylindrical chamber, said finger compartment axis and said handle support member chamber axis being coextensive and defining said horizontal axis of rotation.

3. The device according to claim 2, wherein said at least one of said fingers includes a projecting element connected to and extending radially outwardly from said outer annular surface in parallel relationship with said teeth.

4. The device according to claim 3 wherein each of said fingers are movable between an unbiased mode and a biased mode, wherein in said unbiased mode said at least one projecting element is positioned in one of said valleys in a meshed mode with said teeth wherein said cradle member and said handle support member are in a mutual removably locked relationship, and wherein in said biased mode said at least one projecting element is positioned spaced from said valleys in contact with one of said peaks in an unmeshed mode relative said teeth wherein said cradle member and said handle support member are freely rotatable in both circular directions about said horizontal axis in response to pressure exerted by the forearm and by the pole handle.

5. The device according to claim 3, wherein said at least one of said fingers having a projecting element is two of said fingers each having a projecting element.

6. The device according to claim 5, where said at least one of said fingers having a projecting element is a plurality of said fingers each having a projecting element.

7. The device according to claim 3, wherein said projecting element is an elongated rib.

8. The device according to claim 3, wherein said projecting element is a dimple pin.

9. The device according to claim 1, wherein said plurality of biasable fingers are arranged at equal intervals in a circumferential configuration about said finger compartment axis.

10. The device according to claim 2, wherein said plurality of biasable fingers is four biasable fingers.

11. The device according to claim 4, wherein each of said plurality of fingers has opposed proximal and distal ends relative to said cradle flange, said free end of each of said biasable fingers including an arcuate range that engages said handle support member cylindrical chamber wall adjoining said parallel teeth when said each biasable finger is in said meshed mode.

12. The device according to claim 11, wherein each said arcuate flange of each said finger includes opposed inner and outer flange walls relative to said distal and proximal ends of each of said fingers, said outer flange wall having an outer bevel. at said outer arcuate wall.

13. The device according to claim 12, wherein said inner flange wall has a inner bevel at said inner arcuate wall.

14. The device according to claim 10, wherein said fishing rod handle has a fishing rod handle diameter, and said convex arcuate compartment side wall has a first lower inwardly extending horned end, and said convex arcuate another compartment side wall having a second lower inwardly extending horned end in opposition to said first lower horned end, said first and second lower horned ends being spaced apart at a distance that is greater than the diameter of said fishing rod handle diameter.

* * * * *